United States Patent [19]

Covington et al.

[11] 4,299,540

[45] Nov. 10, 1981

[54] TAIL ROTOR BLADE

[75] Inventors: Cecil E. Covington, Hurst; Ronnie L. Martin, Arlington, both of Tex.

[73] Assignee: Textron Inc., Providence, R.I.

[21] Appl. No.: 272

[22] Filed: Jan. 2, 1979

[51] Int. Cl.³ .......... B64C 11/20; B64C 11/26

[52] U.S. Cl. .......... 416/226

[58] Field of Search .......... 416/226

[56] References Cited

U.S. PATENT DOCUMENTS

| | | | |
|---|---|---|---|
| 2,596,818 | 5/1952 | Mayers | 416/226 |
| 3,002,567 | 10/1961 | Stulen et al. | 416/226 |
| 3,217,807 | 11/1965 | Underhill et al. | 416/226 |
| 3,232,349 | 2/1966 | Ballauer | 416/226 |
| 3,310,117 | 3/1967 | Sliuinsky et al. | 416/226 |
| 3,754,840 | 8/1973 | Zincone | 416/226 |
| 3,813,186 | 5/1974 | Palachek | 416/226 |
| 4,095,322 | 6/1978 | Scarpati | 416/226 |
| 4,150,920 | 4/1979 | Belko | 416/226 |
| 4,188,171 | 2/1980 | Baskin | 416/226 |

*Primary Examiner*—William L. Feeh

*Attorney, Agent, or Firm*—Richards, Harris & Medlock

[57] ABSTRACT

A tail rotor blade for a helicopter has a core 22 whose shape defines the trailing portions of the blade. Core 22 is adhered to upper 20 and lower 21 metallic skins which extend within and are adhered to the inner surfaces at the trailing edge of a metallic nose spar 10. A pair of straps 30, 31 of unidirectional fiberglass strands extend spanwise and are adhered to the inner surface of the leading edges of the skins 20, 21 and the outer leading surfaces of the core 22 as to span chordwise the regions of the joints between nose spar 10 and skins 20, 21.

5 Claims, 3 Drawing Figures

20 30 10a 10 32 24 22 21 31 10b 23

12
40
41
16
2
2
15
13
10
14
11

10
23
10a
10b
30
31
20
21
22
24
32

(2 PLY)

(3 PLY)
(4 PLY)
30

TAIL ROTOR BLADE

TECHNICAL FIELD

This invention relates to a tail rotor blade for a helicopter and more particularly to a tail rotor blade having leading edge and trailing edge reinforcement by unidirectional spanwise fiberglass strapping integrated with the blade core and skins.

BACKGROUND ART

Tail rotor blades heretofore have been provided in a variety of different specific constructions, generally with a honeycomb core to which upper and lower trailing edge skins are attached and which in turn are secured to a nose spar.

In U.S. Pat. No. 4,120,610 (U.S. application Ser. No. 470,520 filed May 16, 1974) there is disclosed a main rotor blade system in which spanwise fiberglass bands are secured to the inner surface of the nose spar assembly to enhance the ability of the blade to withstand centrifugal forces and to prevent catastrophic conditions when the blade develops cracks in metallic portions thereof.

DISCLOSURE OF THE INVENTION

The present invention is directed to a tail rotor blade wherein a metallic honeycomb core has a shape defining the trailing portions of the blade with upper and lower skins adhered to the core and with a stainless steel leading edge spar. Upper and lower unidirectional fiberglass straps are adhered to the leading edge upper and lower surfaces of said core and to the inner leading surfaces of said skins and with the outer leading edge surfaces of the skins being adhered to the inner trailing surfaces of the nose spar. A spanwise strap is secured between the inner trailing surfaces of the skins.

In a further aspect, the first mentioned fiberglass straps are made progressively thinner as they extend from the root to the tip of said rotor blade.

DESCRIPTION OF PREFERRED EMBODIMENTS

Figure 1:
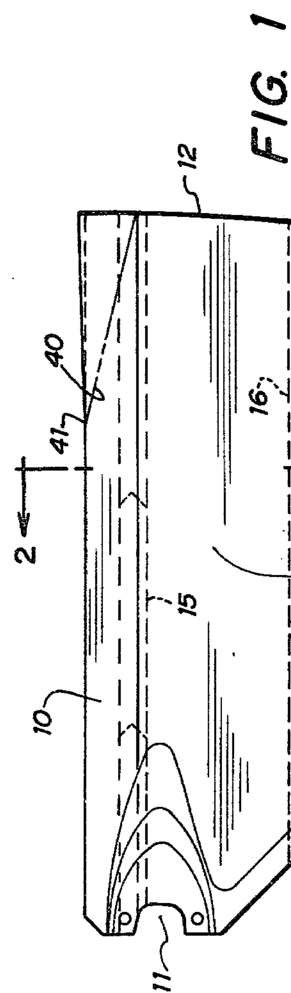
FIG. 1 is a plan view of one embodiment of the present invention.

Referring now to FIG. 1 a helicopter tail rotor blade has been shown comprising a nose spar 10 which extends from an inboard or root coupling portion 11 to the outboard end 12. A trailing section 13 extends from the nose spar to the trailing edge 14.

In accordance with the present invention the rotor blade is provided with three unidirectional fiberglass straps which extend spanwise of the blade.

More particularly a first pair of straps, upper and lower straps, occupy the zones beneath the boundary between the nose spar 10 and the trailing skins 13, the zones being indicated by the dotted lines 15. A third strap occupies the zone between the trailing edge surfaces of the section 13, the zone being indicated by the dotted line 16.

Figure 2:
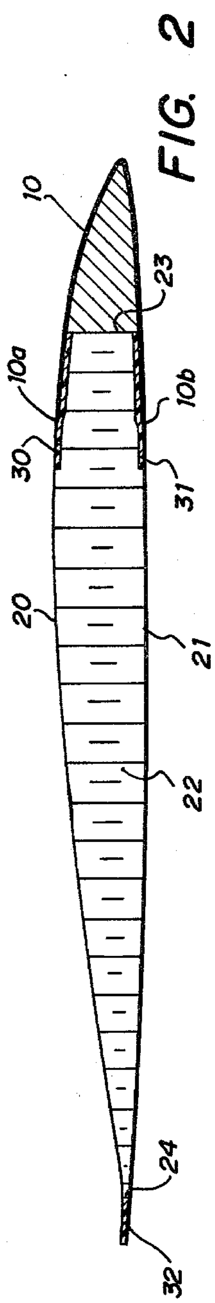
FIG. 2 is a sectional view taken along the lines 2—2 of FIG. 1.

Referring to FIG. 2 which is a cross sectional view of the blade in FIG. 1 it will be seen that the nose spar 10 forms the leading edge of the blade and extends to lines **10*a* and 10*b* which mark the trailing edges of the nose spar 10. Trailing edge skins 20 and 21 extend beneath and are secured to the inner surfaces of the trailing edges of the nose spar 10. The skins 20 and 21 are adhered to a honeycomb core 22, the core 22 being so formed as to define the shape of the blade from the leading edge 23 of core 22 and to the trailing edge 24 of core 22**.

In accordance with the present invention, three unidirectional fiberglass straps are provided. The first strap 30 is adhered to the inside of skin 20 in a region which overlaps the trailing edge **10*a* of nose spar 10. The strap 30 extends to the leading edge of the core 22. The second strap 31 is secured inside of skin 21 where it underlies the trailing edge 10*b* of nose spar 10. Strap 31 extends forward to the leading edge of the core 22**.

A third strap 32 is secured between the trailing edges of the skins 20 and 21 and is positioned immediately behind the trailing edge 24 of core 22.

The blade thus far described provides a unit of design to avoid catastrophic failure modes and provides for longer service life. Thus the blade is constructed of a stainless steel spar, preferably stainless steel skins and an aluminum honeycomb core. The trailing edge strip is constructed of fiberglass unidirectional plys which are oriented unidirectionally spanwise to act as a crack stopper in the event that a skin crack starts propagating toward the trailing edge of the blade. The fiberglass trailing edge strap is precured and then bonded between the skins during a final bonding operation. In addition, the unidirectional fiberglass straps 30 and 31 are also unidirectional spanwise and are installed under the skins and the spar at the spar-to-skin joint to prevent cracks propagating either through the spar or through the skins. Th straps 30 and 31 are of graded thickness decreasing from root to tip. The change in thickness is obtained by dropping off plys of the fiberglass toward the tip of the blade. The straps 30 and 31 are co-cured to the blade during a final bonding operation.

In a preferred embodiment of the invention, that portion of the nose spar at the tip lying forward of line 40 is plated with nickel, the thickness of which is substantial at the tip and which is of zero thickness at the point 41. It is also of zero thickness along line 40 but of maximum thickness as it appears at the tip on the leading edge of the nose spar 10. Nickel plating accommodates the high erosion rate at the tip and tapers to zero thickness cordwise.

In prior art systems, a crack in a blade can propagate at such a fast rate that a failure will occur before found during routine inspections. A blade of the present invention avoids that possibility.

Figure 3:
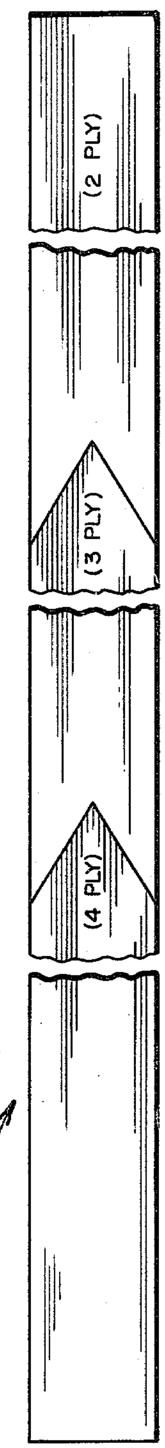
FIG. 3 illustrates an embodiment of a graded fiberglass strap.

Referring now to FIG. 3, strap 30 is shown in simplified form for use with a blade of length of about 53 inches. The strap 30 is shown as formed of a multiple fiberglass tape of the type manufactured and sold by the 3M Company of Minneapolis, Minnesota, and identified as SP 250-S2 Scotch ply fiberglass tape. In a preferred embodiment, in the region from the root to about 18 inches, straps 30 and 31 are each made up of four plys, having a thickness of 0.080 inches. From 18 inches out to about 34 inches the straps 30 and 31 are made up of three plys with a thickness of 0.060 inches. From 34 inches to the tip of the blade the straps 30 and 31 are two-ply straps having 0.040 inches thickness. In the embodiment herein disclosed the straps 30 and 31 have a width of about two inches. It is noted that the plys as they terminate are shaped to a point.

The trailing edge strip 32 is preferably of uniform thickness from root to tip and of a width of about 0.80 inches and of two-ply construction having a thickness of 0.040 inches.

Having described; what is claimed is:

1. A tail rotor blade for a helicopter which comprises:
(a) a metallic nose spar;
(b) a core whose shape defines the trailing portions of the blade;
(c) upper and lower metallic skins which extend within and are adhered to the inner surfaces at the trailing edges of said metallic nose spar and to said core; and
(d) a pair of straps of unidirectional fiberglass strands extending spanwise and adhered to the inner surface of the leading edges of said skins and the outer leading surfaces of said core as to span chordwise the region of the joint between said nose spar and said skins.

2. The combination set forth in claim 1 in which a unidirectional fiberglass strap with the fiberglass strands extending spanwise is adhered between the inner surfaces of the trailing edges of said skins.

3. The combination set forth in claim 1 in which the thickness of said straps progressively decreases from root to tip.

4. The combination set forth in claim 1 in which said straps are about twice as thick at the root as at the tip.

5. The combination set forth in claim 4 in which said straps have a maximum thickness of about 0.080 inches at the root and a minimum thickness of about 0.040 inches at the tip.

* * * * *